June 27, 1933. W. C. HEDGCOCK 1,916,149
TRUCK
Filed Oct. 2, 1931 5 Sheets-Sheet 1
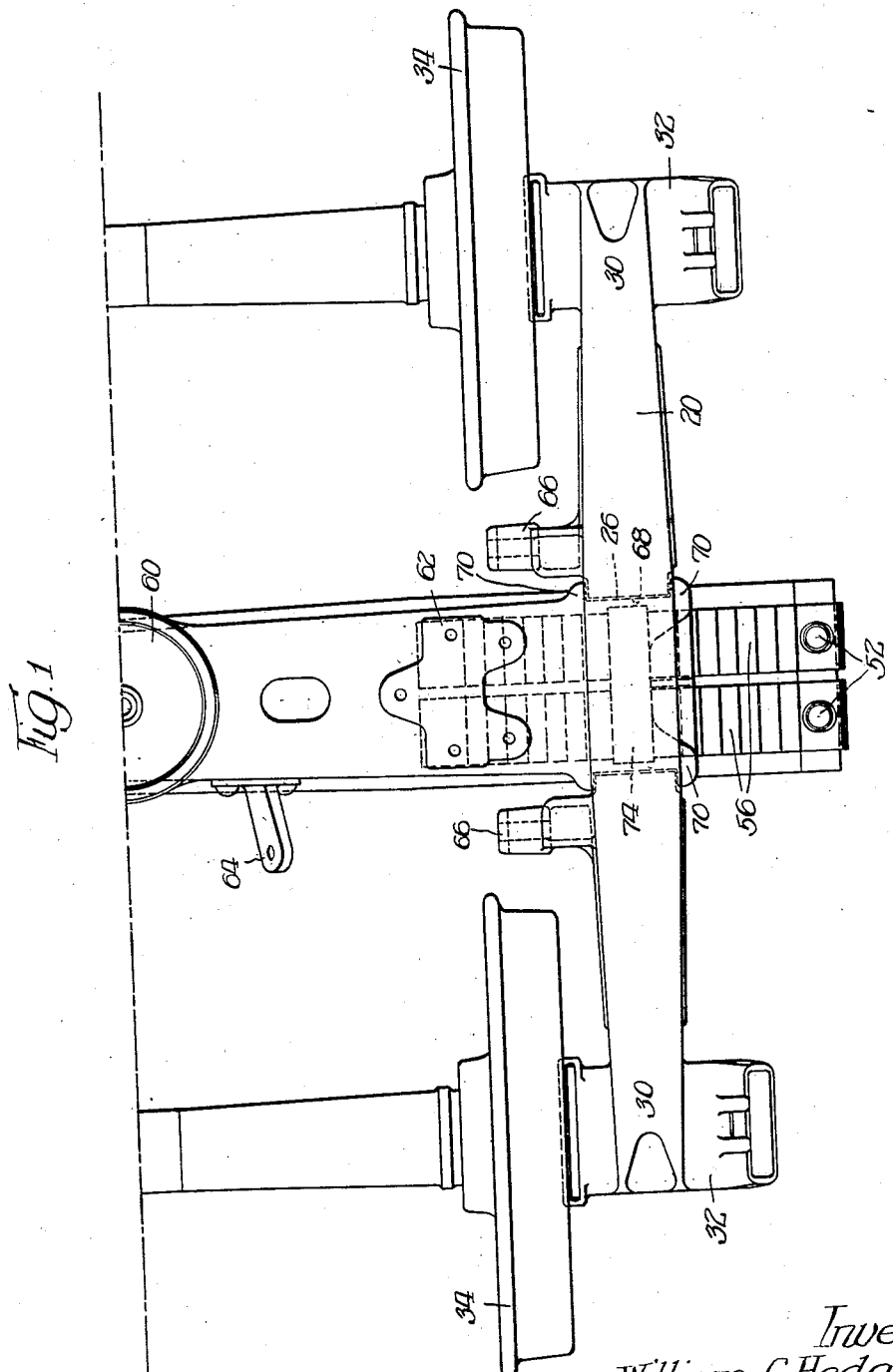
Inventor:
William C. Hedgcock,
By Wilkinson, Huxley, Byron & Knight
attys June 27, 1933.  W. C. HEDGCOCK  1,916,149
TRUCK
Filed Oct. 2, 1931   5 Sheets-Sheet 2
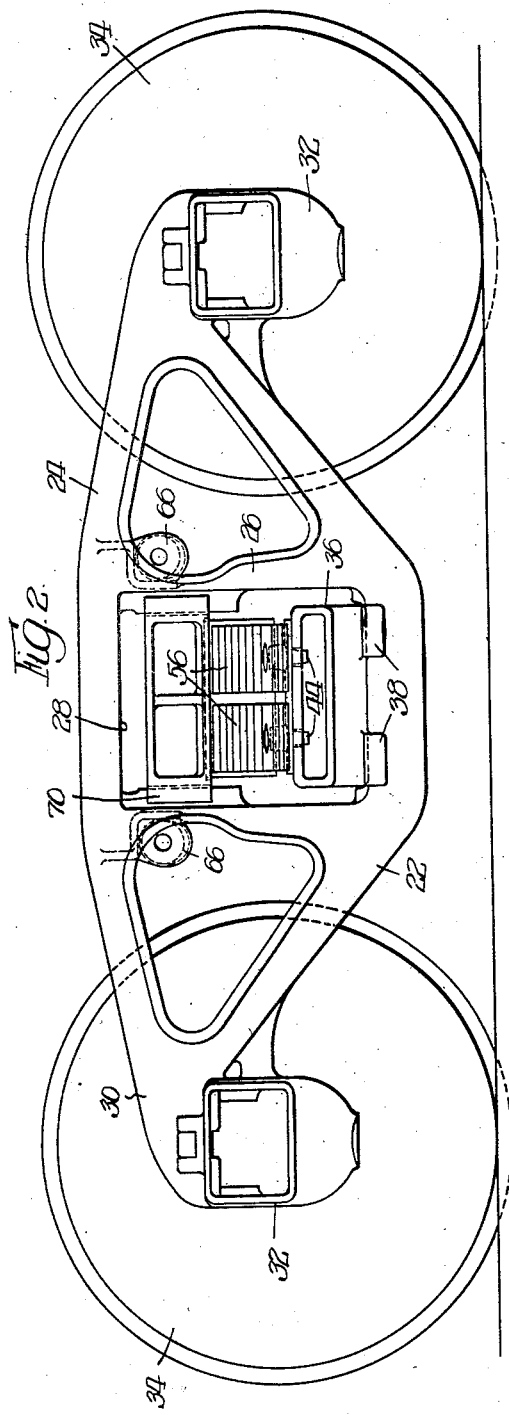
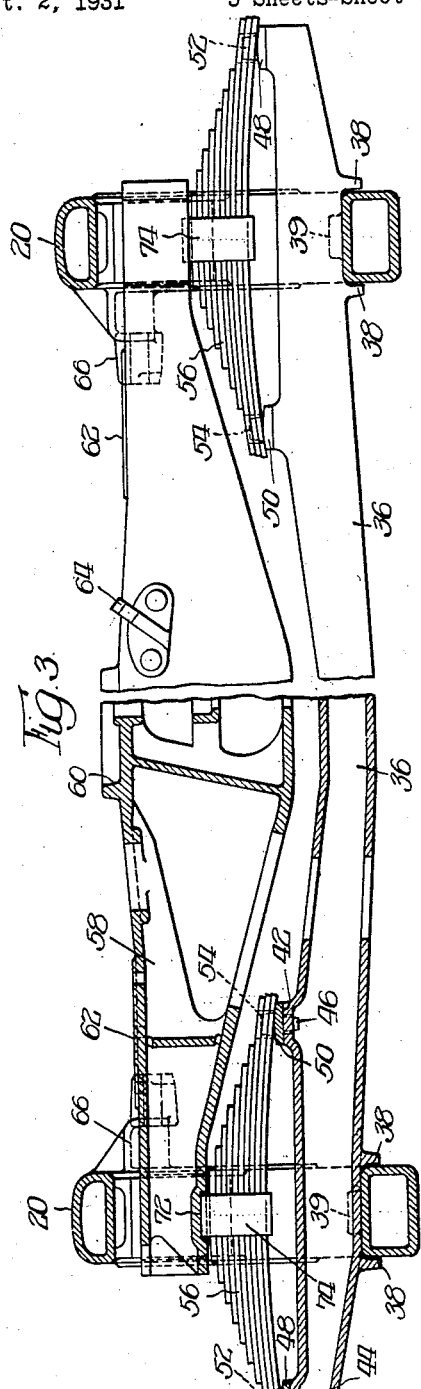
Inventor
William C. Hedgcock,
By Dickinson, Huxley, Byron & Knight
Attys.

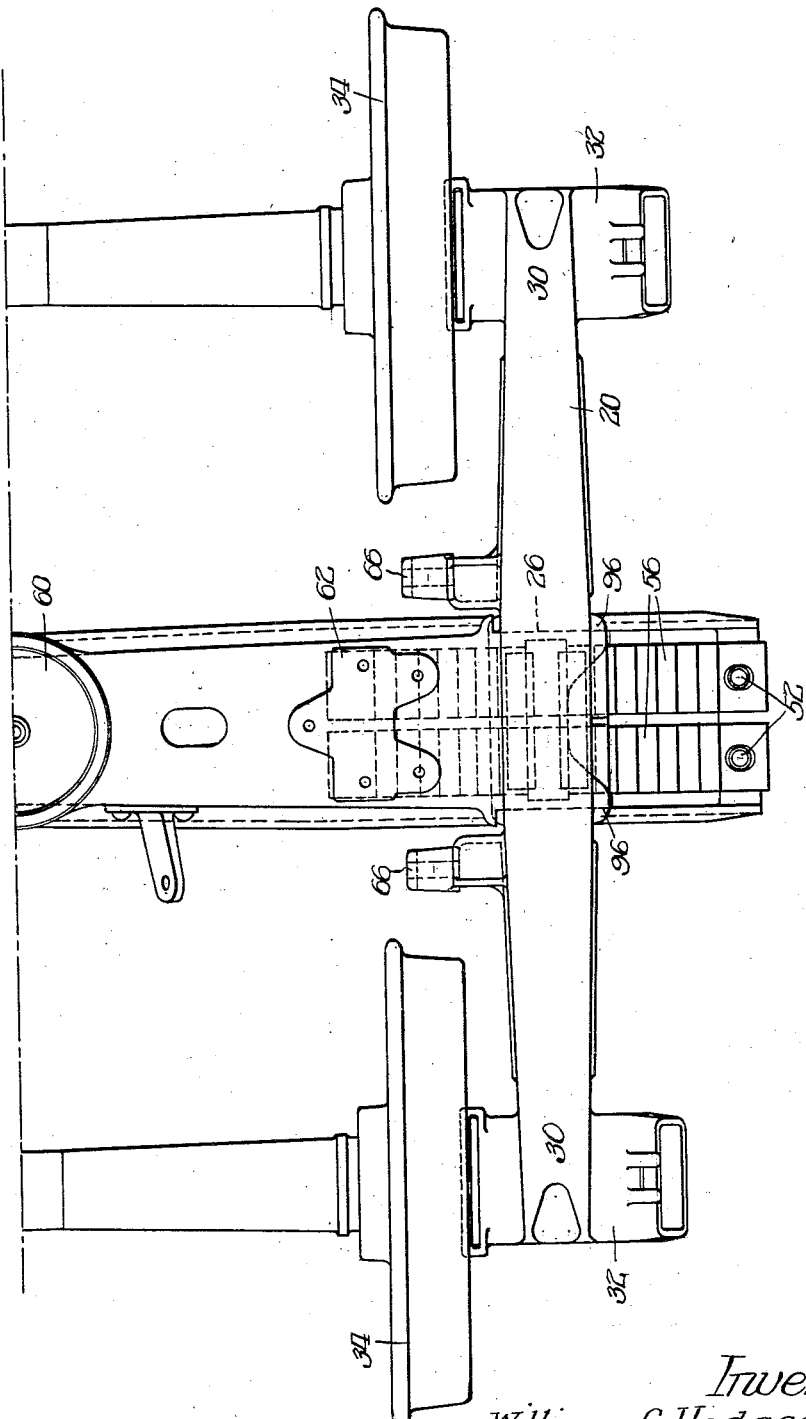

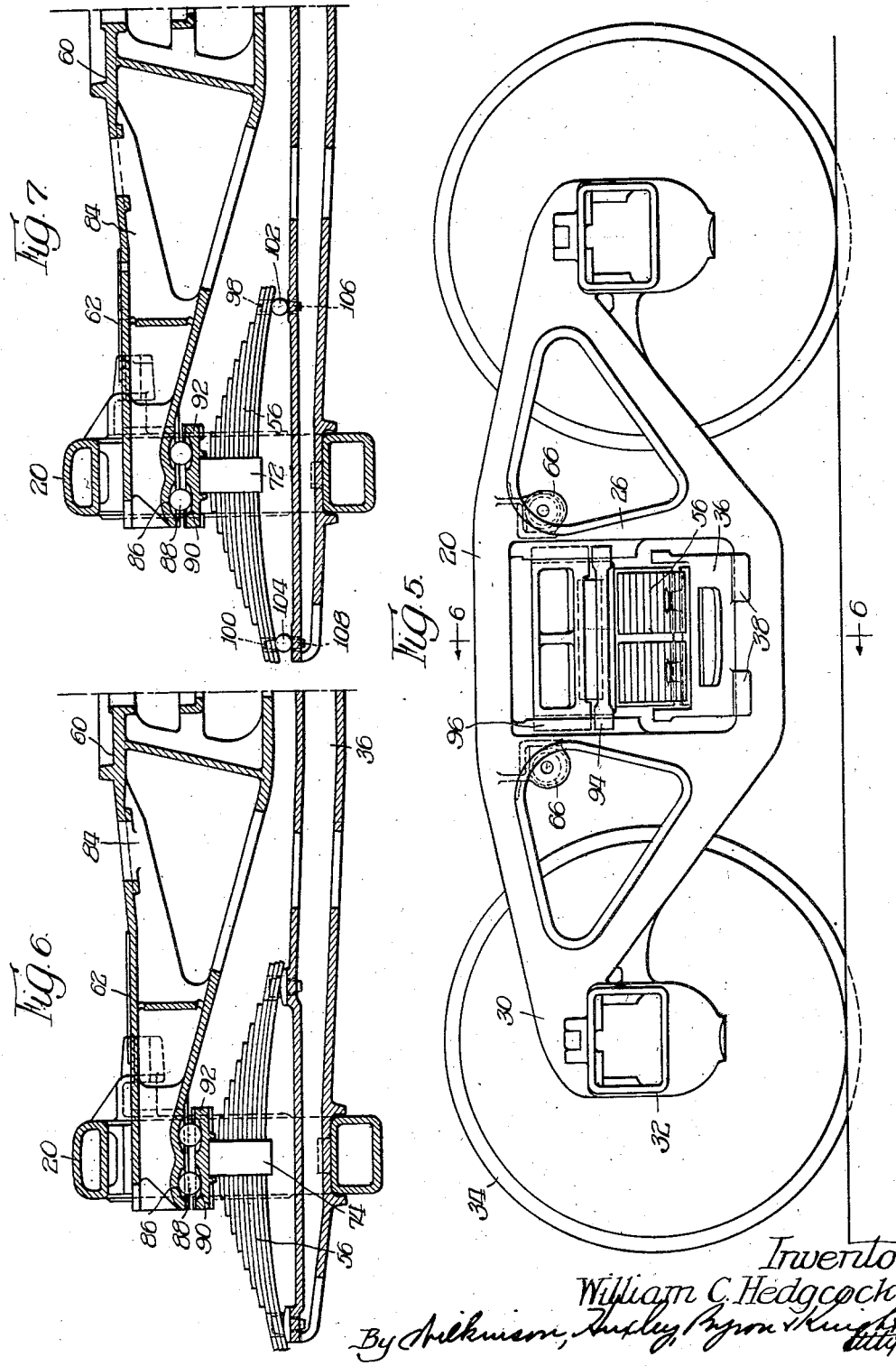

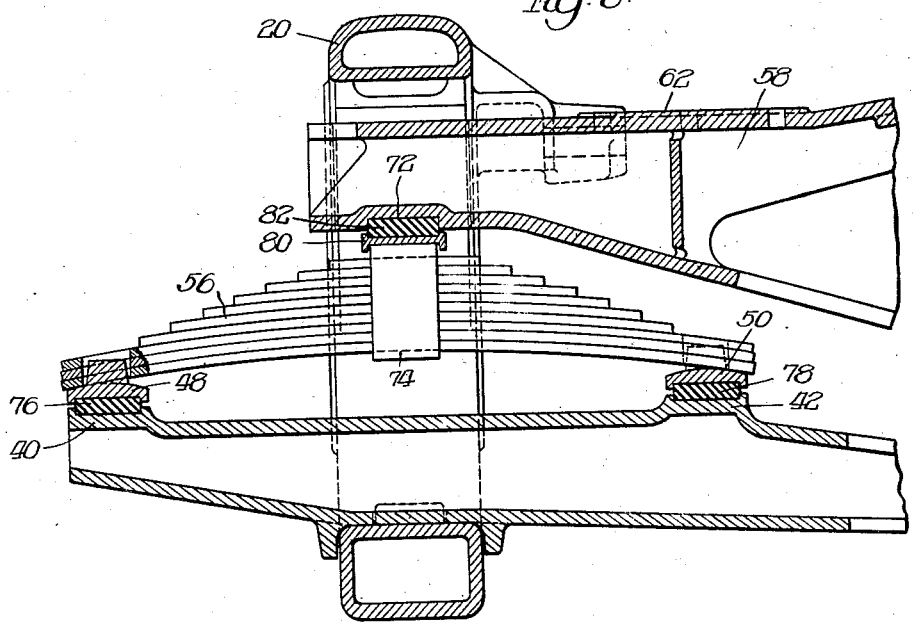
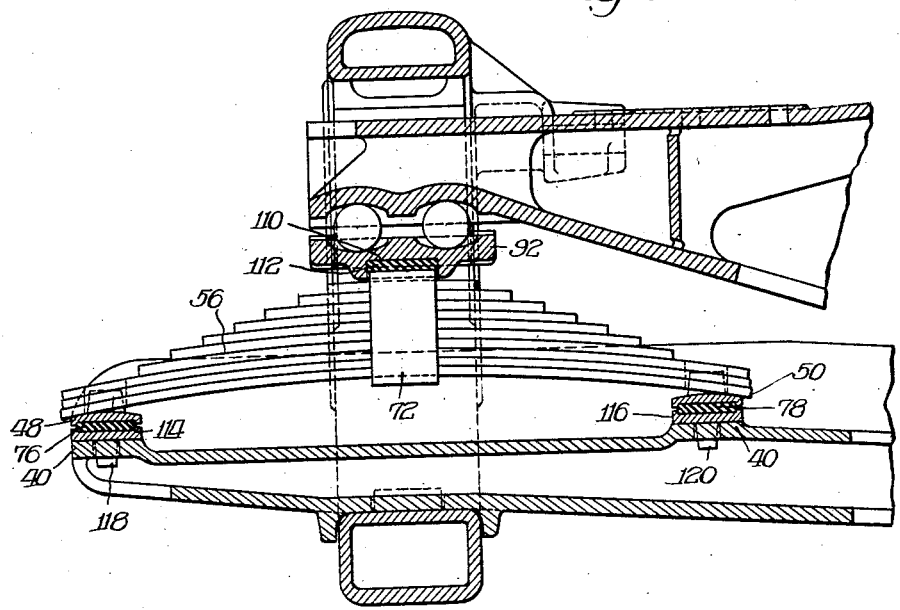

Patented June 27, 1933

1,916,149

UNITED STATES PATENT OFFICE

WILLIAM C. HEDGCOCK, OF WILMETTE, ILLINOIS, ASSIGNOR TO AMERICAN STEEL FOUNDRIES, OF CHICAGO, ILLINOIS, A CORPORATION OF NEW JERSEY

TRUCK

Application filed October 2, 1931. Serial No. 566,492.

This invention pertains to car trucks.

Desirable features for freight car trucks are economy, simplicity, lightness, strength and ease of maintenance, and these features are generally obtained within practical limitations on freight trucks now in use. However, present freight car trucks are very deficient in easy riding qualities, since the spring suspension usually consists only of coil springs which strike a natural period of oscillation or vibration at some operating speed of the car; the resulting motion imparted to truck parts, car body and lading is violent and destructive and results in much damage to lading. Track or wheel irregularities, even if very slight, will set up this oscillation and when the frequency with which these irregularities are passed over agrees with the vibration period of the springs the motion amplifies and continues, due to the lack of dampening qualities in coil springs. The motion may amplify to the extent of causing derailment of the truck.

Efforts have been made to improve this condition by the use of frictional devices with the coil springs for the purpose of dampening the motion, but unless considerable friction is obtained they are not effective enough and if sufficient friction is obtained the spring action becomes too stiff and lacks sensitivity.

It is possible and desirable to provide a freight car truck superior to the truck embodying only coil springs, and this may be accomplished by providing a truck wherein leaf springs are used alone since the friction between the leaves tends to dampen out harmonic vibration. However, with the dimensions available for the usual freight car truck or similar truck, space is limited. It has been customary where leaf springs are used on freight car type trucks to use full elliptic springs mounted on the side frame within the bolster opening and supporting the bolster. The load to be carried by trucks from modern freight cars or locomotive tenders or similar equipment is quite heavy, requiring a high capacity elliptic spring if used. To obtain this high capacity with a full elliptic spring requires a great deal of space, more space than is commonly available within the bolster openings of the usual freight car type of truck. This space is limited because the height from the rail to the top of the side frame is restricted by the clearance required for the car body frame. The distance from the rail to the underside of the side frame must be maintained with a certain minimum clearance prescribed by operating conditions, the dimensions of the structural members of the side frame and truck bolster being determined by the strength required in these parts, the whole developing conditions wherein the space for the springs is limited and wherein full elliptic springs of suitable capacity cannot generally be used.

It is, therefore, an object of this invention to provide a freight car truck wherein semi-elliptic springs are used, these semi-elliptic springs providing the same capacity as full elliptic springs but requiring substantially but half the vertical height required for full elliptic springs, consequently providing a structure which may be used within the usual space limitations.

Another object of the invention is to provide a car truck which provides good riding qualities and at the same time is economical to make and maintain, is simple and light in construction and fulfills all requirements of manufacture and service.

Still another object of the invention is to provide a truck construction wherein resilient pads are provided for dampening out metallic vibration transmitted through metallic truck parts, and also for the purpose of deadening noise.

With these and various other objects in view, the invention may consist of certain novel features of construction and operation as will be more fully described and particularly pointed out in the specification, drawings and claims appended hereto.

In the drawings, which illustrate embodiments of the device and wherein like reference characters are used to designate like parts—

Figure 1 is a fragmentary top plan view of a truck construction embodying the invention;

Figure 2 is a side elevation of the truck construction shown in Figure 1;

Figure 3 is a transverse fragmentary sectional elevation, the section through the bolster being taken substantially on the transverse center line of the truck construction illustrated in Figures 1 and 2;

Figure 4 is a fragmentary top plan view of a modified form of a truck construction embodying the invention;

Figure 5 is a side elevation of the truck construction shown in Figure 4;

Figure 6 is a transverse fragmentary sectional elevation taken substantially in the plane as indicated by line 6—6 of Figure 5;

Figure 7 is a transverse sectional elevation corresponding to Figure 6 showing a modified form of spring mounting;

Figures 8 and 9 are enlarged fragmentary sectional elevations through modified forms of truck constructions corresponding to Figures 3 and 6 respectively.

Referring first of all more particularly to the truck construction illustrated in Figures 1 to 6 inclusive, the side frame 20 is preferably of truss construction, including the tension member 22 and compression member 24 integrally connected by spaced column guides 26 forming the window or bolster opening 28 in said side frame. The tension and compression members converge adjacent their ends as at 30 and are provided with the journal boxes 32 shown as of the standard A. R. A. construction, though they may be of any preferable construction. The journal boxes have cooperative relation with the journal ends of the wheel and axle assemblies 34 which also may be of any preferable construction.

The spaced side frames are connected and spaced by the spring plank 36 extending transversely of the truck and into and through the windows 28, the spring plank being provided with the depending flanges 38 embracing the lower arch bar of the tension member, thus holding the side frames in spaced relation laterally and against twisting laterally. The spring plank may also receive the dowel 39 provided on the lower arch bar for positioning said plank.

The spring plank outwardly and inwardly of the side frame is provided with seat portions 40 and 42 apertured for reception of the depending dowels 44 and 46 provided on the seat members 38 and 50. Said seat members are provided with upwardly extending positioning dowels 52 and 54 adapted to be received in suitable apertures formed in the outer and inner ends of the leaf assembly 56. The bolster 58 is provided with the usual center and side bearings 60 and 62, and brake hanger brackets 64 and 66 are provided on the bolster and side frames having cooperative relation with the usual brake rigging.

Each end of the bolster is mounted to extend into the bolster opening or window 28, and is provided with the spaced guiding surfaces 68 and the guide lugs 70 which embrace the column guides 26 for sliding cooperation therewith whereby the bolster is maintained in lateral relation with respect to the side frame. An enlarged opening is provided in the side frame below the guiding faces of the columns for clearance of the guide lugs 70 in assembling the bolster and side frame. The bolster is provided with the seat 72 on the lower chord thereof, said seat being disposed substantially in the plane of the side frames for cooperative relation with the spring band 74 of the spring assembly 56 whereby the bolster is supported directly by the semi-elliptic springs.

In the modification illustrated in Figure 8, the parts remain substantially the same as described above, and are similarly numbered. However cushioning means are provided between the various parts. In this modification the outer and inner seat portions 40 and 42 are recessed for the reception of the rubber or other resilient pads 76 and 78, and the seat members 48 and 50 are also recessed for the reception of said pad members. The spring pad 74, instead of seating directly in the recess 72 is provided with the member 80 embracing a portion of the spring pad, said member being recessed for the reception of the resilient pad 82 disposed in the recess 72 of the bolster 58.

In the constructions shown in Figures 4 to 7 inclusive and 9, a lateral motion bolster 84 is provided, said bolster being provided with the center bearing 60 and the side bearings 62, and extending into the bolster opening. The bolster in this case, instead of seating directly on the spring bands 72 of the leaf spring assemblies 56, is provided with the lateral motion roller tracks 86 for receiving the lateral motion rollers 88 seated on suitable tracks 90 provided in the roller seat member 92, said member being seated on the spring band 72 in the modification shown in Figures 6 and 7. The roller seat member 92 is guided between the column guides 26 and is provided with the spaced lugs 94 embracing the columns and preventing the displacement of said member. The bolster is provided with the lugs 96 which permit a suitable lateral motion of the bolster. The bolster is thereby permitted a certain amount of lateral motion to reduce lateral shocks which might be transmitted by the side frame and the bolster. The extent of the lateral motion is limited by means of the stops or lugs 96.

In the construction shown in Figure 7 the inner and outer ends of the leaf spring assembly 56 receive the dowels 98 and 100 of the roller seat members 102 and 104, said members being positioned on the spring plank by engagement of depending dowels 106 and 108 in suitable apertures provided in said spring plank. There is thus an anti-friction engagement between the leaf springs and spring plank.

In the construction shown in Figure 9 the member 92 is recessed as at 110 for the reception of the resilient pad 112 and also for the spring band 72 of the leaf spring assembly 56. In this case the seat members 48 and 50 are provided with the resilient pads 76 and 78 received in a recess in the seat members 114 and 116 seated on the seat portions 40 and 42 positioned by means of the depending dowels 118 and 120 provided on said members.

With the type of trucks described the spring plank is a load carrying member in the nature of a beam supported at two spaced points and loaded at four spaced points. This necessitates the spring plank being made strong enough to resist the bending action resulting from such a method of loading. For this purpose the spring plank may be made of any suitable section such as box section or channel section. In case the channel section is used, the seat members may be provided on pedestals, all as shown in application Serial No. 556,488, filed October 2, 1931.

It is to be understood that I do not wish to be limited by the exact embodiments of the device shown which are merely by way of illustration and not limitation, as various and other forms of the device will of course be apparent to those skilled in the art without departing from the spirit of the invention or the scope of the claims.

I claim:

1. In a car truck, the combination of a side frame, a spring plank connected to said side frame and extending outwardly thereof, said spring plank having spring seats disposed inwardly and outwardly of said side frame and substantially in horizontal alignment, a load carrying member disposed above said spring plank, and a semi-elliptic leaf spring supporting said load carrying member at a point and seated on said seats.

2. In a car truck, the combination of a side frame, a spring plank connected to said side frame and extending outwardly thereof, said spring plank having spring seats disposed inwardly and outwardly of said side frame and substantially in horizontal alignment, a load carrying member disposed above said spring plank, and a semi-elliptic leaf spring supporting said load carrying member at a point and seated on said seats, and resilient pads interposed between said load carrying member and said leaf spring.

3. In a car truck, the combination of a side frame, a spring plank connected to said side frame and extending outwardly thereof, said spring plank having spring seats disposed inwardly and outwardly of said side frame and substantially in horizontal alignment, a load carrying member disposed above said spring plank, and a semi-elliptic leaf spring supporting said load carrying member at a point and seated on said seats, and resilient pads interposed between said leaf spring and said seats.

4. In a car truck, the combination of a side frame, a spring plank connected to said side frame and extending outwardly thereof, said spring plank having spring seats disposed inwardly and outwardly of said side frame and substantially in horizontal alignment, a load carrying member disposed above said spring plank, and a semi-elliptic leaf spring supporting said load carrying member at a point and seated on said seats, and resilient pads interposed between associated truck parts.

5. In a car truck, the combination of a side frame, a spring plank connected to said side frame and extending outwardly thereof, said spring plank having spring seats disposed inwardly and outwardly of said side frame and substantially in horizontal alignment, a load carrying member disposed above said spring plank, and a semi-elliptic leaf spring supporting said load carrying member at a point and seated on said seats, and resilient pads interposed between said load carrying member and said leaf spring and between said leaf spring and said seats.

6. In a car truck, the combination of a side frame, a spring plank connected to said side frame and extending outwardly thereof, said spring plank having spring seats disposed inwardly and outwardly of said side frame and substantially in horizontal alignment, a load carrying member disposed above said spring plank, a semi-elliptic leaf spring seated on said seats, and lateral motion means interposed between said leaf spring and said load carrying member whereby said load carrying member is mounted for lateral movement.

7. In a car truck, the combination of a side frame, a spring plank connected to said side frame and extending outwardly thereof, said spring plank having spring seats disposed inwardly and outwardly of said side frame and substantially in horizontal alignment, a load carrying member disposed above said spring plank, and a semi-elliptic leaf spring seated on said seats, and lateral motion means supported on said leaf spring intermediate the ends thereof and cooperating with said load carrying member whereby said load carrying member is mounted for lateral motion.

8. In a car truck, the combination of a side frame including tension and compression members and spaced columns integrally connecting said tension and compression members and forming a window therewith, a spring plank connected to said side frame intermediate said columns and extending outwardly thereof, said spring plank having spring seats disposed inwardly and outwardly of said side frame and substantially in horizontal alignment, a bolster disposed above said spring plank and having cooperative engagement with said columns, and a semi-elliptic leaf spring supporting said bolster at a point and seated on said seats.

9. In a car truck, the combination of a side frame including tension and compression members and spaced columns integrally connecting said tension and compression members and forming a window therewith, a spring plank connected to said side frame in said window and extending outwardly thereof, said spring plank having spring seats disposed inwardly and outwardly of said frame and substantially in horizontal alignment, a bolster disposed above said spring plank, a semi-elliptic leaf spring supported on said seats, a lateral motion track supported on said leaf spring intermediate the ends thereof and having cooperative engagement with said columns, and lateral motion means interposed between said track and said bolster whereby said bolster is mounted for lateral movement.

10. A spring plank including tension and compression members and spaced connecting side members forming substantially a box section, aligned spring seats disposed on said compression member adjacent each end thereof, and positioning means provided on said tension member intermediate each pair of seats.

11. In a car truck, the combination of a side frame including tension and compression members, spaced columns integrally connecting said tension and compression members and forming a window therewith, a spring plank connected to said side frame in said window and extending outwardly thereof, said spring plank having spring seat portions disposed inwardly and outwardly of said side frame and substantially in horizontal alignment, anti-friction rollers disposed on said seat portions, a bolster disposed above said spring plank and having cooperative engagement with said columns, and a semi-elliptic leaf spring supporting said bolster at a point and seated on said rollers.

12. In a car truck, the combination of a side frame including tension and compression members, spaced columns integrally connecting said tension and compression members and forming a window therewith, a spring plank connected to said side frame in said window and extending outwardly thereof, said spring plank having spring seat portions disposed inwardly and outwardly of said side frame and substantially in horizontal alignment, anti-friction rollers disposed on said seat portions, a bolster disposed above said spring plank and having cooperative engagement with said columns, a semi-elliptic leaf spring supported on said anti-friction rollers, a lateral motion track supported on said leaf spring intermediate the ends thereof and having cooperative engagement with said columns and lateral motion means interposed between said track and said bolster whereby said bolster is mounted for lateral motion.

Signed at Chicago, Illinois, this 22nd day of September, 1931.

WILLIAM C. HEDGCOCK.